(12) United States Patent
Sucan et al.

(10) Patent No.: US 11,814,078 B2
(45) Date of Patent: *Nov. 14, 2023

(54) METHODS AND SYSTEMS FOR USING REMOTE ASSISTANCE TO MANEUVER AN AUTONOMOUS VEHICLE TO A LOCATION

(71) Applicant: Waymo LLC, Mountain View, CA (US)

(72) Inventors: Ioan-Alexandru Sucan, Mountain View, CA (US); Joshua Herbach, Mountain View, CA (US); Collin Winter, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,340

(22) Filed: Nov. 30, 2022

(65) Prior Publication Data
US 2023/0100535 A1 Mar. 30, 2023

Related U.S. Application Data

(63) Continuation of application No. 17/013,996, filed on Sep. 8, 2020, now Pat. No. 11,535,276.

(51) Int. Cl.
*B60W 60/00* (2020.01)
*G05D 1/00* (2006.01)

(52) U.S. Cl.
CPC ....... *B60W 60/0011* (2020.02); *G05D 1/0016* (2013.01); *G05D 1/0022* (2013.01); *G05D 1/0044* (2013.01); *G05D 2201/0213* (2013.01)

(58) Field of Classification Search
CPC ............. B60W 60/0011; G05D 1/0016; G05D 1/0022; G05D 1/0044; G05D 2201/0213
USPC .......................................................... 701/23
See application file for complete search history.

(56) References Cited

U.S. PATENT DOCUMENTS

| | | | |
|---|---|---|---|
| 9,500,494 B2 | 11/2016 | van Os | |
| 9,630,631 B2 | 4/2017 | Alaniz | |
| 10,086,699 B2* | 10/2018 | Konet | B60K 35/00 |
| 10,134,278 B1* | 11/2018 | Konrardy | G08G 1/166 |

(Continued)

FOREIGN PATENT DOCUMENTS

DE 102016118967 A1 4/2018

*Primary Examiner* — Muhammad Shafi
(74) *Attorney, Agent, or Firm* — McDonnell Boehnen Hulbert & Berghoff LLP

(57) ABSTRACT

Example embodiments relate to using remote assistance to maneuver an autonomous vehicle to a location. A computing device used by a remote operator may receive a request for assistance from a vehicle that indicates the vehicle is stopped at a first location with one or more navigation options for enabling the vehicle to navigate from the first location to a second location. At least one navigation option includes a maneuver technique that requires operator approval prior to execution. The computing device may then display a graphical user interface (GUI) that conveys the one or more navigation options. Based on detecting a selection of a particular navigation option, the computing device may transmit instructions to the vehicle to perform the particular navigation option. The vehicle may configured to navigate from the first location to the second location by performing the particular navigation option while monitoring for changes in the environment.

20 Claims, 12 Drawing Sheets

(56) References Cited

U.S. PATENT DOCUMENTS

| | | | |
|---|---|---|---|
| 10,139,828 B2 | 11/2018 | Ho | |
| 10,156,848 B1* | 12/2018 | Konrardy | G16Y 10/80 |
| 10,384,678 B1* | 8/2019 | Konrardy | G06F 11/3688 |
| 11,366,471 B2* | 6/2022 | Lockwood | G05D 1/0044 |
| 2013/0190964 A1* | 7/2013 | Uehara | G01C 21/3691 |
| | | | 701/25 |
| 2017/0192423 A1 | 7/2017 | Rust | |
| 2018/0365908 A1* | 12/2018 | Liu | G05D 1/005 |
| 2020/0164897 A1* | 5/2020 | Krome | B60W 50/0098 |
| 2020/0239023 A1* | 7/2020 | Srinivasan | G05D 1/0276 |
| 2020/0409358 A1* | 12/2020 | Gogna | G05D 1/0088 |

* cited by examiner

METHODS AND SYSTEMS FOR USING REMOTE ASSISTANCE TO MANEUVER AN AUTONOMOUS VEHICLE TO A LOCATION

CROSS REFERENCE TO RELATED APPLICATION

The present application is a continuation of U.S. patent application Ser. No. 17/013,996 (now U.S. Pat. No. 11,535,276), filed on Sep. 8, 2020, the entire contents is hereby incorporated by reference.

BACKGROUND

Vehicles are used to complete various types of tasks, including transportation of objects and people. With advances in technology, some vehicles are configured with systems that enable the vehicles to operate in a partial or fully autonomous mode. When operating in a partial or fully autonomous mode, some or all of the navigation aspects of vehicle operation are controlled by a vehicle control system rather than by a human driver. Autonomous operation of a vehicle can involve systems sensing the vehicle's surrounding environment to enable a computing system to plan and safely navigate.

SUMMARY

Example embodiments describe herein relate to techniques for using remote assistance to maneuver an autonomous vehicle to a location. The techniques may enable remote operators to assist stranded autonomous vehicles or to safely navigate complex or unexpected situations that can arise during autonomous navigation.

In one aspect, an example method is provided. The method may involve receiving, at a computing device, a request for assistance from a vehicle operating in an environment. The request indicates the vehicle is stopped at a first location and specifies one or more navigation options for enabling the vehicle to navigate from the first location to a second location. At least one navigation option includes one or more maneuver techniques that requires operator approval prior to performance. The method also involves, responsive to receiving the request for assistance, displaying, by the computing device, a graphical user interface (GUI) that conveys the one or more navigation options. The method further involves, based on detecting a selection of a particular navigation option from the one or more navigation options, transmitting, by the computing device and to the vehicle, instructions to perform the particular navigation option. The vehicle is configured to navigate from the first location to the second location by performing the particular navigation option while monitoring for one or more changes in the environment.

In another aspect, an example system is provided. The system may include a vehicle and a computing device. The computing device is configured to receive a request for assistance from the vehicle operating in an environment. The request indicates the vehicle is stopped at a first location and specifies one or more navigation options for enabling the vehicle to navigate from the first location to a second location. At least one navigation option includes one or more maneuver techniques that requires operator approval prior to performance. The computing device is also configured to, responsive to receiving the request for assistance, display a graphical user interface (GUI) that conveys the one or more navigation options. The computing device is further configured to, based on detecting a selection of a particular navigation option from the one or more navigation options, transmit, to the vehicle, instructions to perform the particular navigation option. The vehicle is configured to navigate from the first location to the second location by performing the particular navigation option while monitoring for one or more changes in the environment.

In yet another example, an example non-transitory computer readable medium having stored therein program instructions executable by a computing device to cause the computing device to perform functions is provided. The functions may include receiving a request for assistance from a vehicle operating in an environment. The request indicates the vehicle is stopped at a first location and specifies one or more navigation options for enabling the vehicle to navigate from the first location to a second location. At least one navigation option includes one or more maneuver techniques that requires operator approval prior to performance. The functions also include, responsive to receiving the request for assistance, displaying a graphical user interface (GUI) that conveys the one or more navigation options. The functions further include, based on detecting a selection of a particular navigation option from the one or more navigation options, transmitting, to the vehicle, instructions to perform the particular navigation option, wherein the vehicle is configured to navigate from the first location to the second location by performing the particular navigation option while monitoring for one or more changes in the environment.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
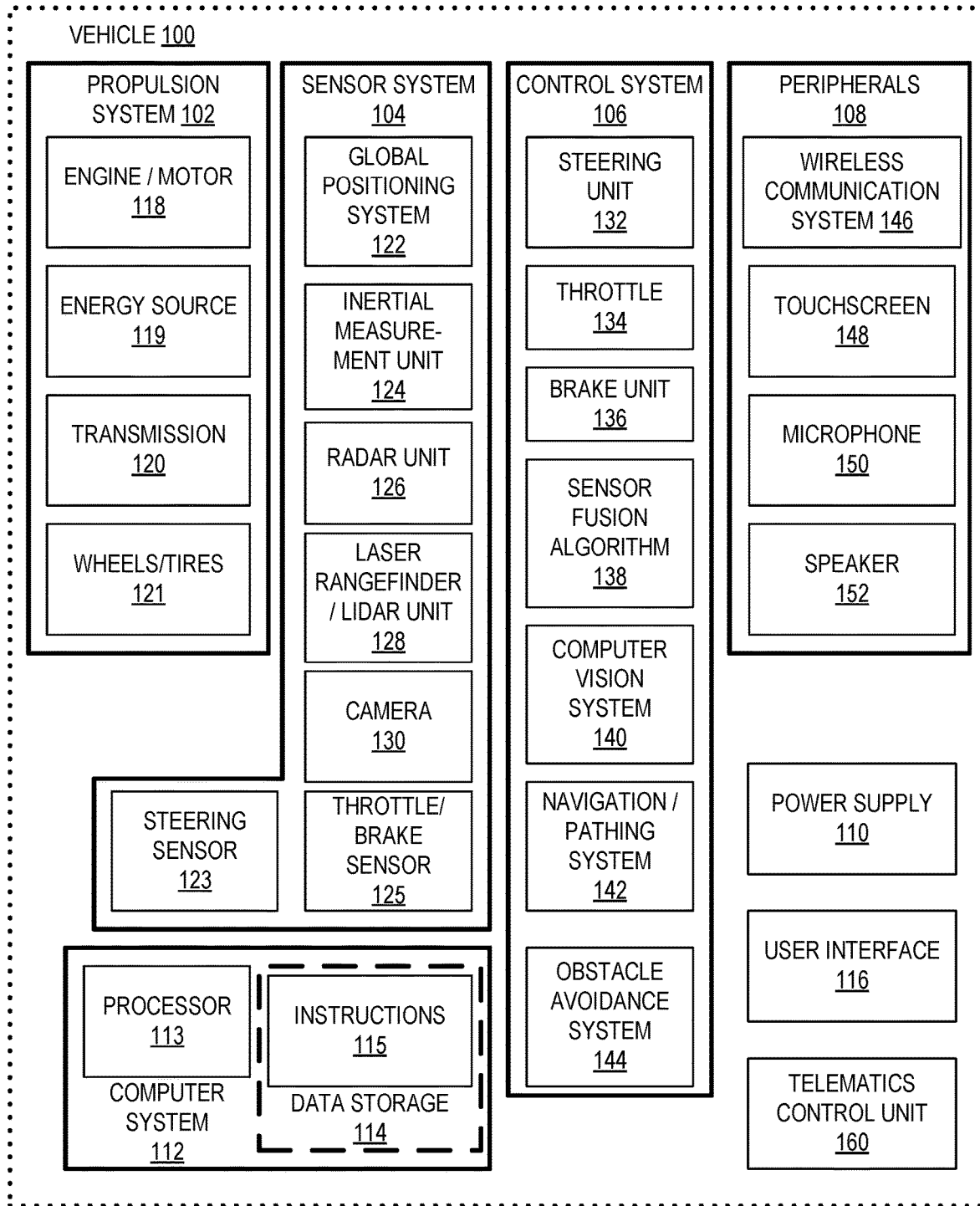
FIG. 1 is a functional block diagram illustrating a vehicle, according to example implementations.
Figure 2A:
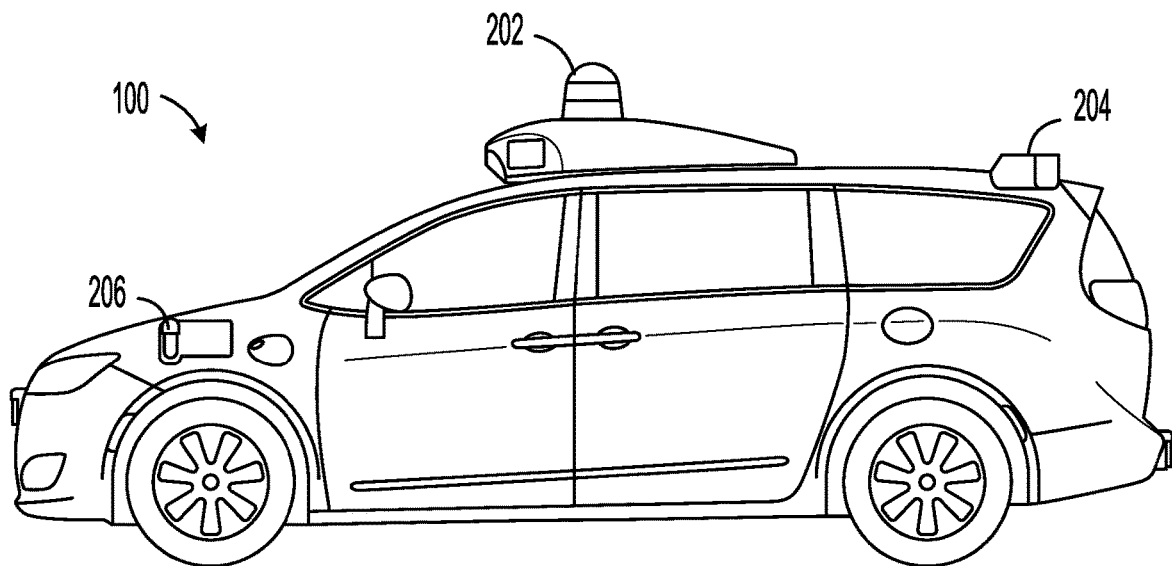
FIG. 2A illustrates a side view of a vehicle, according to one or more example embodiments.
Figure 2B:
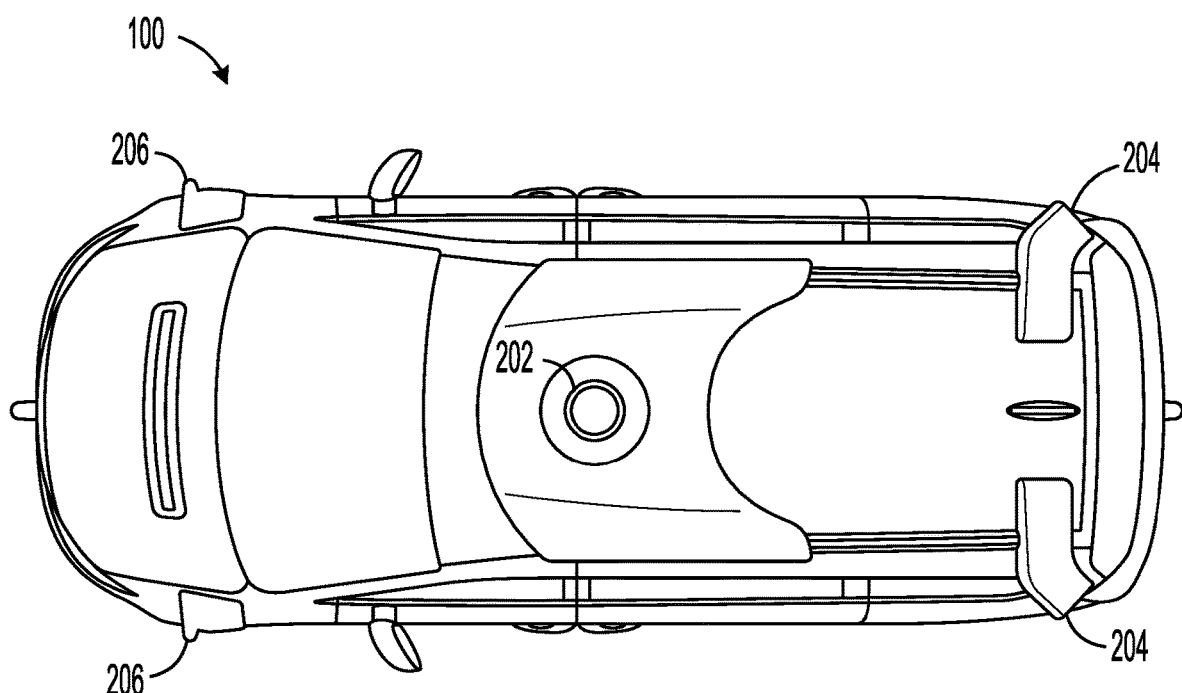
FIG. 2B illustrates a top view of a vehicle, according to one or more example embodiments.
Figure 2C:
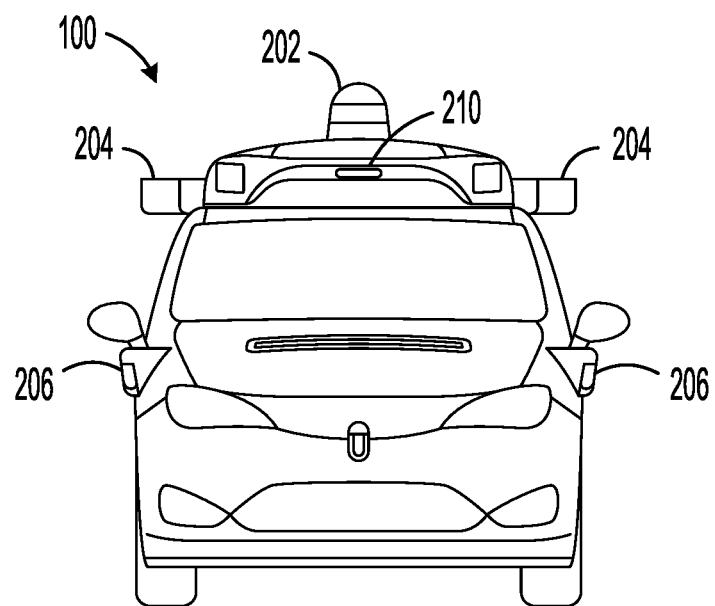
FIG. 2C illustrates a front view of a vehicle, according to one or more example embodiments.
Figure 2D:
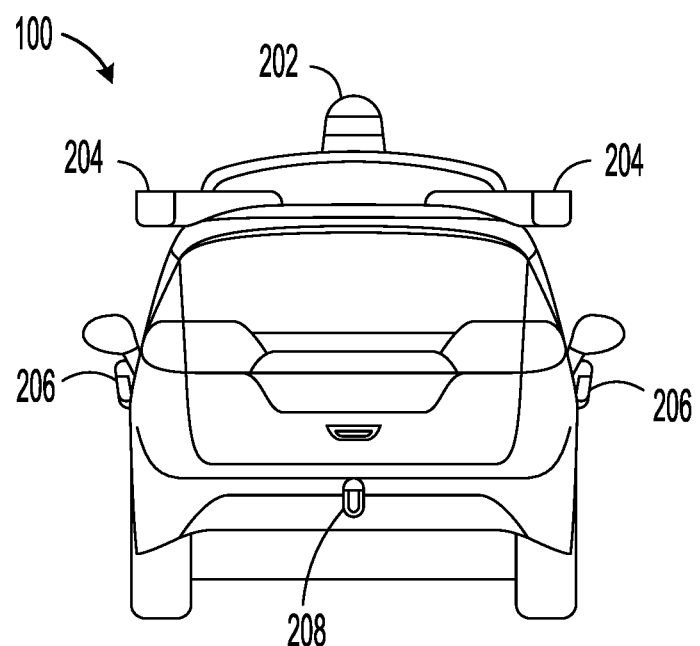
FIG. 2D illustrates a back view of a vehicle, according to one or more example embodiments.
Figure 2E:
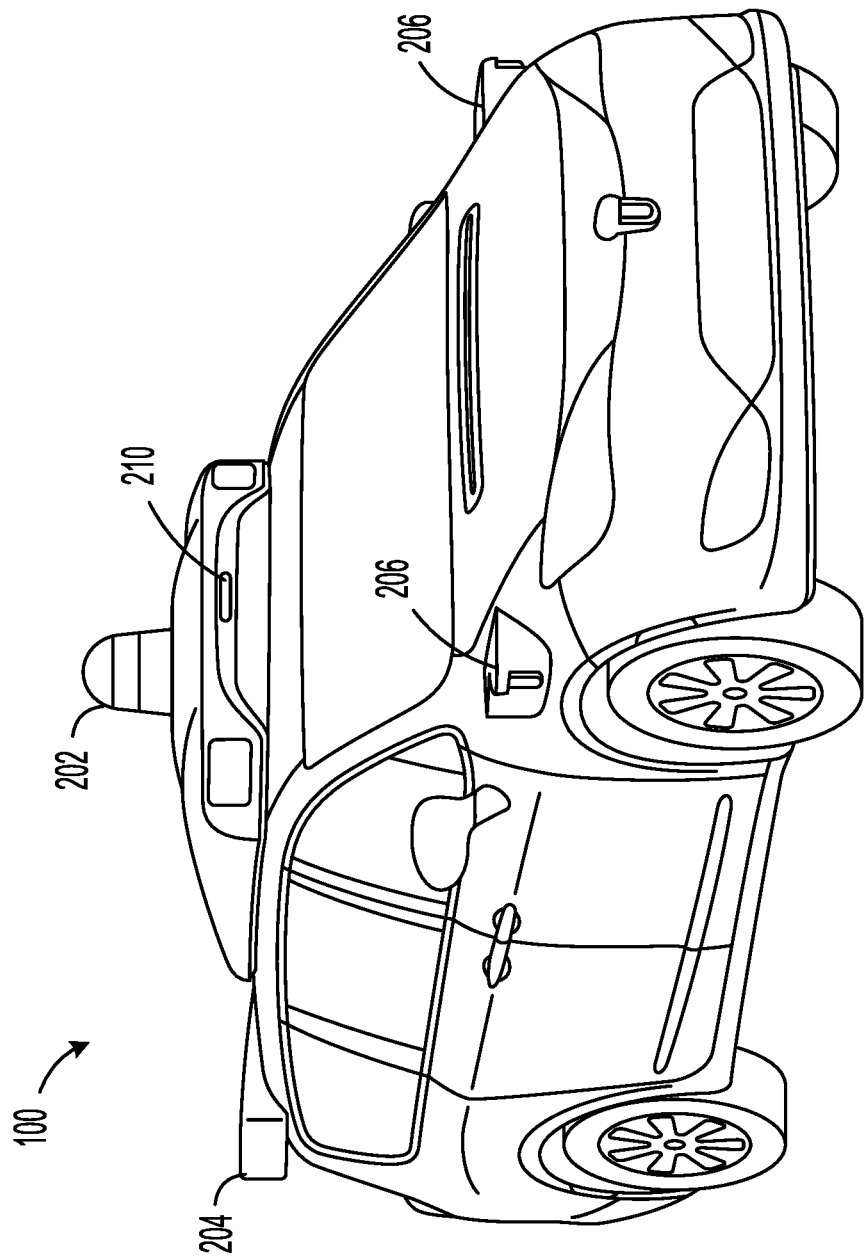
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Advancements in computing, sensors, and other technologies have enabled vehicles to safely navigate autonomously between locations without requiring input from a human driver. By processing measurements of the surrounding environment from vehicle sensors in near real-time, an autonomous vehicle can transport passengers or objects between locations while avoiding obstacles, obeying traffic requirements, and performing other actions that are typically conducted by a human driver. The shift of control of the vehicle over to a vehicle control system can permit passengers to devote their attention to tasks other than driving.

The availability of autonomous-capable vehicles may also facilitate an increase usage of vehicle-sharing. Vehicle-sharing can often involve a fleet of vehicles that are centrally-managed by an overall system that is configured to receive requests from potential passengers and dispatch nearby vehicles to locate, pick up, and provide rides to passengers in exchange for a fee. Within the fleet, each vehicle may fulfill requests for rides from passengers. For instance, a passenger may use a smartphone application or another computing device (e.g., a wearable computing device) to submit a request to the system managing the fleet of vehicles. A request from a potential passenger may include information to assist the system complete the request, such as the passenger's current location to enable a pick-up by a vehicle, the quantity of passengers that plan on receiving transportation, and one or more desired destinations for the vehicle to drop off passengers. In some instances, passengers may have profiles that are utilized by the vehicle-sharing system to efficiently manage ride requests and payment for the rides. In response to receiving the request, the system may identify and dispatch a vehicle within the fleet that can quickly travel to the passenger's current location and autonomously transport the passenger or passengers to one or more desired destination or destinations accordingly. After completing a ride request, the vehicle may subsequently be dispatched to provide transportation for other passengers.

Whether operating as part of a vehicle-sharing fleet or independently, a vehicle capable of autonomous or semi-autonomous operation may encounter complex or unexpected situations that can interfere with the vehicle's current navigation strategy. In some cases, a vehicle's sensor system may detect the presence of an unexpected obstacle or multiple obstacles that can limit the current navigation plan of the vehicle. Without a human driver to interpret the situation, the vehicle may remain stopped as a default until obtaining enough measurements of environment changes that enable safely proceeding. In some instances, however, the vehicle may remain stopped for a substantial amount of time if the environment remains static and vehicle systems are not able to identify a safe navigation strategy for further navigation.

Because autonomous vehicles may navigate in various locations, there are numerous situations that may cause navigation issues for the vehicle navigation system and/or other vehicle systems. For example, a parking lot may include parked vehicles, pedestrians, shopping carts, and other potential obstacles that can interfere with an autonomous vehicle's ability to navigate per the lines and rules of the parking lot. In some cases, the navigation system of an autonomous vehicle may become temporarily stranded if too many obstacles interfere with potential routes. Similarly, encountering an accident between other vehicles or road construction are other example scenarios that may unexpectedly disrupt an autonomous vehicle's path of navigation. These are just a few examples where the current navigation strategy for an autonomous vehicle can be impacted and potentially limited in some way.

Example embodiments described herein relate to using remote assistance to maneuver an autonomous vehicle to a location. When an autonomous vehicle encounters a situation where navigation progress is impeded in some way (e.g., by one or more obstacles or other changes in the environment), the autonomous vehicle may request and obtain remote assistance that can help the vehicle effectively overcome the situation. Remote assistance can be used to help the vehicle in various ways, such as route determination, obstacle avoidance, monitoring performance of a route, and/or to enable the vehicle to perform typically unused maneuver techniques autonomously (e.g., U-turns and reversing), among others. A human operator can review a vehicle's situation and provide remote assistance in some way that can help vehicle systems overcome complex or unexpected situations. In some examples, remote assistance is used as a way for a human operator to identify a route for an autonomous vehicle to execute and subsequently monitor the autonomous vehicle maneuver from the vehicle's current location to the target destination according to the route selected by the human operator. While monitoring the vehicle performing the route, the operator can stop and provide further assistance to the autonomous vehicle if necessary. In some instances, the operator may cause the vehicle to temporarily stop, change route, and/or perform other maneuvers.

In some examples, a request for assistance may involve a vehicle communication interface (or another vehicle-based system) initially transmitting the request via wireless communication to one or more computing devices positioned physically separate from the vehicle, such as a remote computing device associated with a human operator. The request for assistance may include sensor data (e.g., images, video, and location information) and/or other information that can help the remote computing device or a human operator use the computing device to provide some form of assistance to the vehicle. Further details regarding the communication of requests for assistance, information within a given request, and management of requests are disclosed herein.

As indicated above, vehicles may submit requests for assistance to obtain human input that can help resolve a variety of situations that a human driver would typically be able to overcome. An autonomous vehicle may determine that the current situation encountered by the vehicle may require the vehicle to perform a maneuver technique or multiple techniques that are typically not executed by the vehicle during autonomous operation. For instance, the vehicle may be prohibited from using some maneuver techniques unless permitted via approval from a remote operator, such as U-turns and reverse technique (i.e., backing up a particular distance). By way of example, an autonomous vehicle may normally be limited to forward navigation, but may encounter a situation in which it is beneficial for the vehicle to perform a U-turn. In such a situation, the autonomous vehicle may utilize remote assistance to review and approve performance of the U-turn prior to executing the U-turn. In some instances, the remote operator may review and decide to select (or provide) an alternate navigation option better suited for the vehicle to perform that does not include the U-turn. Remote assistance can also be used to approve (or reject) when the autonomous vehicle proposes a strategy that involves other types of maneuvers (e.g., crossing over the median due to construction) and/or involves temporarily reducing the safety buffer maintained around the vehicle during navigation. As such, autonomous vehicles may utilize remote assistance, which can involve a human operator reviewing, approving, monitoring determining, and/or modifying one or more navigation strategies that may require deviating from standard operations and/or rules followed during autonomous navigation.

When utilizing remote assistance, the autonomous vehicle requesting remote assistance may be configured to develop and provide one or more navigation options for a remote operator to review and select from. In particular, the navigation option(s) may be determined locally by vehicle systems and represent routes that might enable the vehicle to navigate from its current location to a target destination. The navigation option or options may be determined locally to decrease the resources required remotely to enable remote assistance. When the vehicle determines and proposes one or more options for review by the remote operator, the remote computing device can serve as the platform that provides the options for the human operator to review. In some examples, the autonomous vehicle may determine a strategy for overcoming the encountered situation and responsively seek remote assistance if a confidence associated with performing the strategy is below a threshold confidence level. The vehicle may also seek remote assistance if multiple navigation options appear to be comparatively viable to overcome a particular situation and the remote assistance can be used to identify which option to utilize. Thus, remote assistance can enable a human operator to help select (or determine) a strategy.

In some instances, the vehicle may rely on remote assistance to review and approve a navigation strategy that involves complex maneuver techniques that may be off-limits without approval and/or to approve a strategy that involves disfavored maneuvers (e.g., driving over a road's median) or temporarily reducing the vehicle's safety buffer maintained around the vehicle. In such cases, the vehicle systems may use remote assistance as a way to perform a navigation strategy that requires human operator approval prior to performance.

Navigation option or options may be presented with the request for assistance or subsequent to a connection being established between the vehicle and the computing device associated with a remote operator. By developing one or more navigation options locally at the vehicle, the remote assistance process can be efficiently performed with the remote computing device serving as a display portal that enables a remote operator to quickly review and select a particular navigation option for the autonomous vehicle to utilize. The computing device may convey navigation options and/or other information obtained from the vehicle using a GUI. In some examples, the computing device may enable the remote operator to review new sensor data (e.g., images, video) obtained from the vehicle in near real-time.

In some examples, the computing device may display a virtual path for each navigation option that enables the vehicle to navigate between its current location and a target destination. The virtual paths may be displayed on top of a sensor representation of the environment (e.g., one or more images) or a map representation of the general area of the vehicle. For instance, the computing device may obtain sensor data and/or map data and represent each navigation option using virtual paths (e.g., color lines with arrows). As an example, a first navigation option may be displayed as an orange virtual path and a second navigation option may be displayed as a purple virtual path. The different colors can help a remote operator differentiate during review.

In addition, the computing device may further divide the virtual path for each navigation option into segments where each pair of consecutive segments is separated via a checkpoint. When the autonomous vehicle is performing a navigation option, the vehicle may be configured to transmit a progress update at each checkpoint as the vehicle navigates. This way, a remote operator may be able to oversee the progress as the vehicle performs the desired operation, which can also enable the remote operator to stop the vehicle or provide other modifications to the navigation strategy in near real-time. The computing device may display each navigation option with an option to modify one or more parameters of the navigation option. For instance, a remote operator may adjust a portion of the route associated with a navigation option. The computing device may also enable a remote operator to draw an operator route for the vehicle to utilize.

Navigation options can be also displayed with information that helps a remote operator understand each option. For instance, each navigation option may include a score that represents a difficulty associated with the vehicle performing one or more maneuvers to complete the navigation option. In addition, some navigation options may include indications when the navigation option includes one or more maneuvers that require approval from a human operator prior to performance, such as disfavored maneuvers. Other indications can also be displayed with a navigation option, such as an indication where a vehicle might need to temporarily reduce its safety buffer.

In other embodiments, the remote computing device may be configured to use sensor data from the vehicle and potentially data from other sources (e.g., map data) to develop the navigation options to present to the remote operator to review. Human operators can also help identify objects in the environment, adjust navigation routes, confirm or deny navigation options proposed by a vehicle, check on passengers, and perform other forms of remote assistance.

In some embodiments, remote assistance may involve establishing a secure communication connection between a human operator and one or more vehicle systems or passengers traveling within a vehicle. The human operator may receive sensor data depicting the environment in near real-time and provide assistance to the vehicle (or passengers) immediately.

Example systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in enabling navigation by vehicle 100, such as steering unit 132, throttle 134, brake unit 136, sensor fusion algorithm 138, computer vision system 140, navigation/ pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
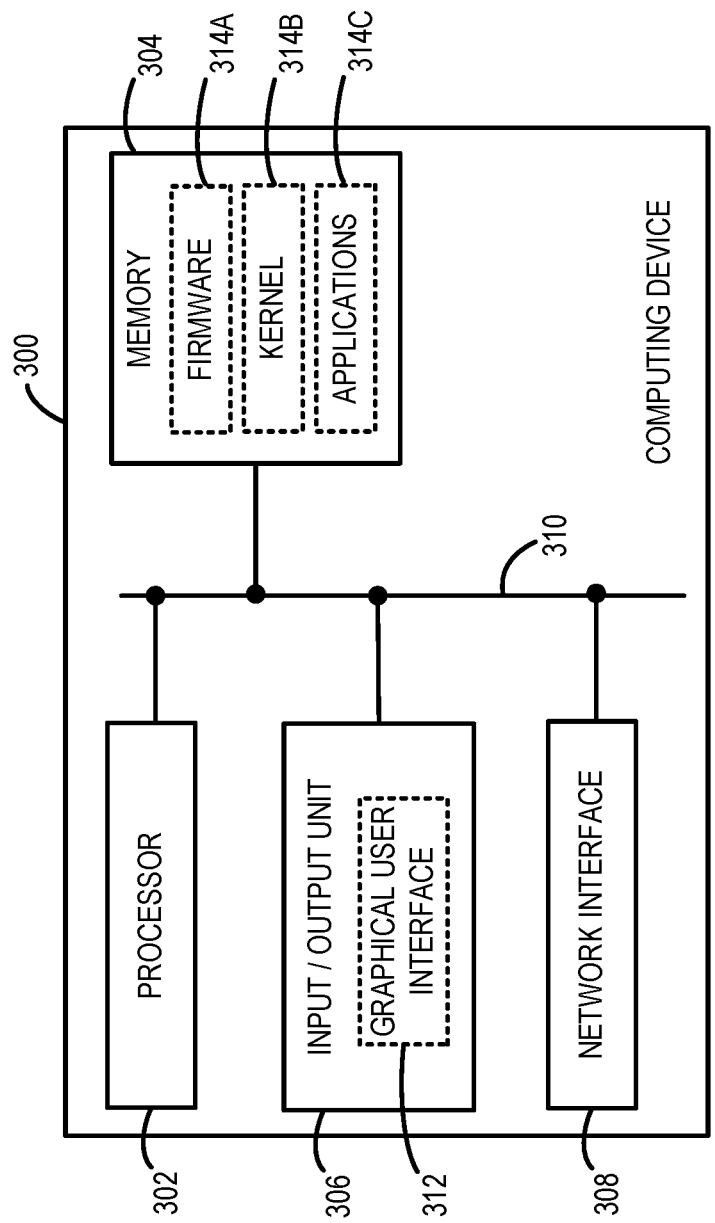
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples.

Computing device 300 may include fixed memory as well as one or more removable memory units, the latter including but not limited to various types of secure digital (SD) cards.

Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more userspace software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
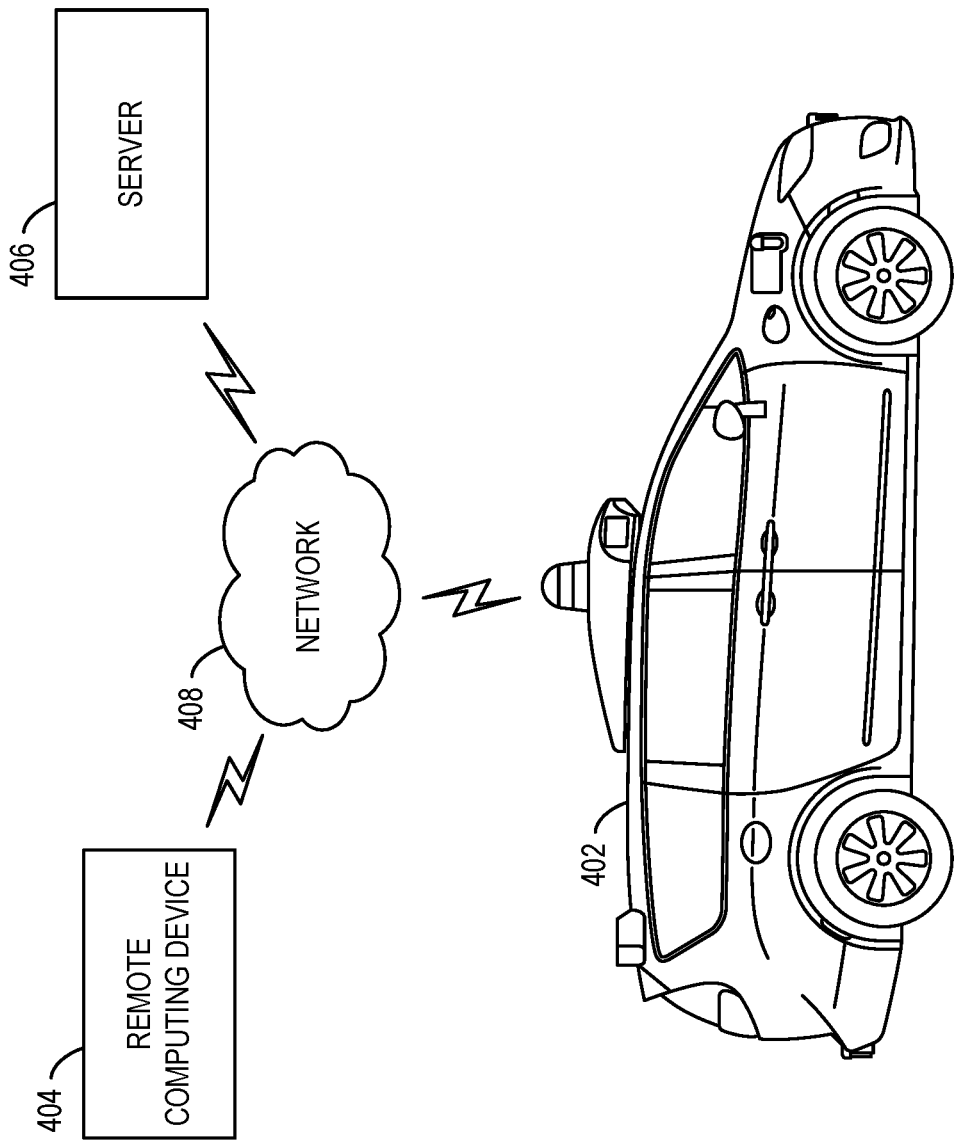
FIG. 4 is a system for wireless communication between computing devices and a vehicle, according to one or more example embodiments.

FIG. 4 is a system for wireless communication between computing devices and a vehicle, according to one or more example embodiments. System 400 may enable vehicles (e.g., vehicle 402) to obtain remote assistance from human operators using computing devices positioned remotely from the vehicles (e.g., remote computing device 404). Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may transport passengers or objects between locations, and may take the form of any one or more of the vehicles discussed above, including passenger vehicles, cargo shipping vehicles, farming and manufacturing vehicles, and dual-purpose vehicles. When operating in an autonomous mode (or semi-autonomous mode), vehicle 402 may navigate to pick up and drop off passengers (or cargo) between desired destinations. In some embodiments, vehicle 402 can operate as part of a fleet of vehicles, such as within a fleet of ride-share vehicles.

Remote computing device 404 may represent any type of device related to enabling providing remote assistance techniques, including but not limited to those described herein. Within examples, remote computing device 404 may represent any type of device configured to (i) receive information related to vehicle 402, (ii) provide an interface (e.g., a GUI, physical input interfaces) through which a human operator can in turn perceive the information and input a response related to the information, and (iii) transmit the response to vehicle 402 or to other devices (e.g., storage at server 406). As such, remote computing device 404 may take various forms, such as a workstation, a desktop computer, a laptop, a tablet, a mobile phone (e.g., a smart phone), a wearable device (e.g., a headset) and/or a server. In some examples, remote computing device 404 may include multiple computing devices operating together in a network configuration. In further embodiments, remote computing device 404 may resemble a vehicle simulation center with the remote operator positioned as the drive of the simulation center. In addition, remote computing device 404 may operate as a head mountable device that can simulate the perspective of vehicle 402.

The position of remote computing device 404 relative to vehicle 402 can vary within examples. For instance, remote computing device 404 may have a remote position from vehicle 402, such as operating inside a physical building. In another example, remote computing device 404 may be physically separate from vehicle 402, but operate inside vehicle 402 to enable a passenger of vehicle 402 to act as the human operator. For instance, remote computing device 404 can be a touchscreen device operably by a passenger of vehicle 402. Operations described herein that are performed by remote computing device 404 may be additionally or alternatively performed by vehicle 402 (i.e., by any system(s) or subsystem(s) of vehicle 100). In other words, vehicle 402 may be configured to provide a remote assistance mechanism with which a driver or passenger of the vehicle can interact.

Operations described herein can be performed by any of the components communicating via network 408. For instance, remote computing device 404 may determine remote assist options for a human operator to review based on different levels of information provided by vehicle 402. In some embodiments, vehicle 402 may determine potential navigation options for remote computing device 404 to display for a remote operator to review. Potential options could include routes, vehicle movements, and other navigation parameters for review by remote computing device 404 and/or a remote operator using remote computing device 404.

In other embodiments, remote computing device 404 may analyze sensor data or other information from vehicle 402 to determine the situation and potential options for a remote operator to review. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. As such, server 406 may be configured to perform any operation(s), or portions of such operation(s), that is/are described herein as performed by remote computing system 404 and/or vehicle 402. Some implementations of wireless communication related to remote assistance may utilize server 406, while others may not.

Network 408 represents infrastructure that can enable wireless communication between computing devices, such as vehicle, 402, remote computing device 404, and server 406. For example, network 408 can correspond to a wireless communication network, such as the Internet or a cellular wireless communication network. The various systems described above may perform various operations. These operations and related features will now be described.

In some examples, a remote computing system (e.g., remote computing device 404 or server 406) may operate in one of two modes. The first of these modes may serve, in essence, as a means for a human operator (of the vehicle and/or the remote computing system) to provide remote assistance support for the vehicle. The remote computing system may enable a human operator to provide this support in near real-time or less frequently than real-time.

The second of these two modes may serve, at a minimum, as a means for keeping the human operator alert. The human operator may be a passenger or driver of the vehicle, or may be a third party located remotely from the vehicle but tasked with the responsibility of providing remote assistance to the vehicle (and possibly to other vehicles as well). Regardless of who the human operator is, it is desirable to keep the human operator alert so that the human operator can provide optimal remote assistance with minimal delay.

For instance, there may be scenarios in which the vehicle may not have requested remote assistance in a certain amount of time (e.g., one hour), and therefore the human operator tasked with providing remote assistance to the vehicle may not have taken any remote assistance action in that amount of time, which may be long enough where the human operator may become fatigued or otherwise less attentive than desirable. In these and other types of possible scenarios, it may be desirable to periodically prompt the human operator during this time, via the remote computing system, with alertness data to keep them alert. The alertness data may take various forms, such as archived images, audio, or video having confirmed or unconfirmed object identifications, also including generated natural-language questions regarding the confirmed or unconfirmed object identifications.

Remote assistance tasks may also include the human operator providing an instruction to control operation of the vehicle (e.g., instruct the vehicle to travel to a particular destination associated with an identified passenger). In some scenarios, the vehicle itself may control its own operation based on the human operator's feedback related to the identification of the object. For instance, upon receiving a confirmation that the occupancy of the vehicle meets a desired occupancy, the vehicle control system may cause the vehicle to safely transport the passengers to a requested destination. In some examples, a remote operator can enable a vehicle to temporarily perform one or more operations to resolve a situation that the vehicle may normally not be permitted to perform. For instance, remote computing device 404 may be used to enable vehicle 402 to back up, navigate with a decreased buffer zone, or travel in a zone that is usually off limits (e.g., over the median or use a driveway).

In some embodiments, remote assistance for vehicles can originate from a network of remote operators. For example, a vehicle may submit a request for assistance that is received at an entry point of the network. The entry point may connect the request with a remote operator that can provide assistance. The remote operator may be selected based on credentials associated with the remote operator that indicate that she or her is able to handle the type of assistance that is being requested and/or the operator's availability, among other potential parameters. The entry point may analyze information within the request to route requests for assistance accordingly. For example, the network of remote operators may be used to provide assistance to an entire fleet of autonomous vehicles.

Figure 5:
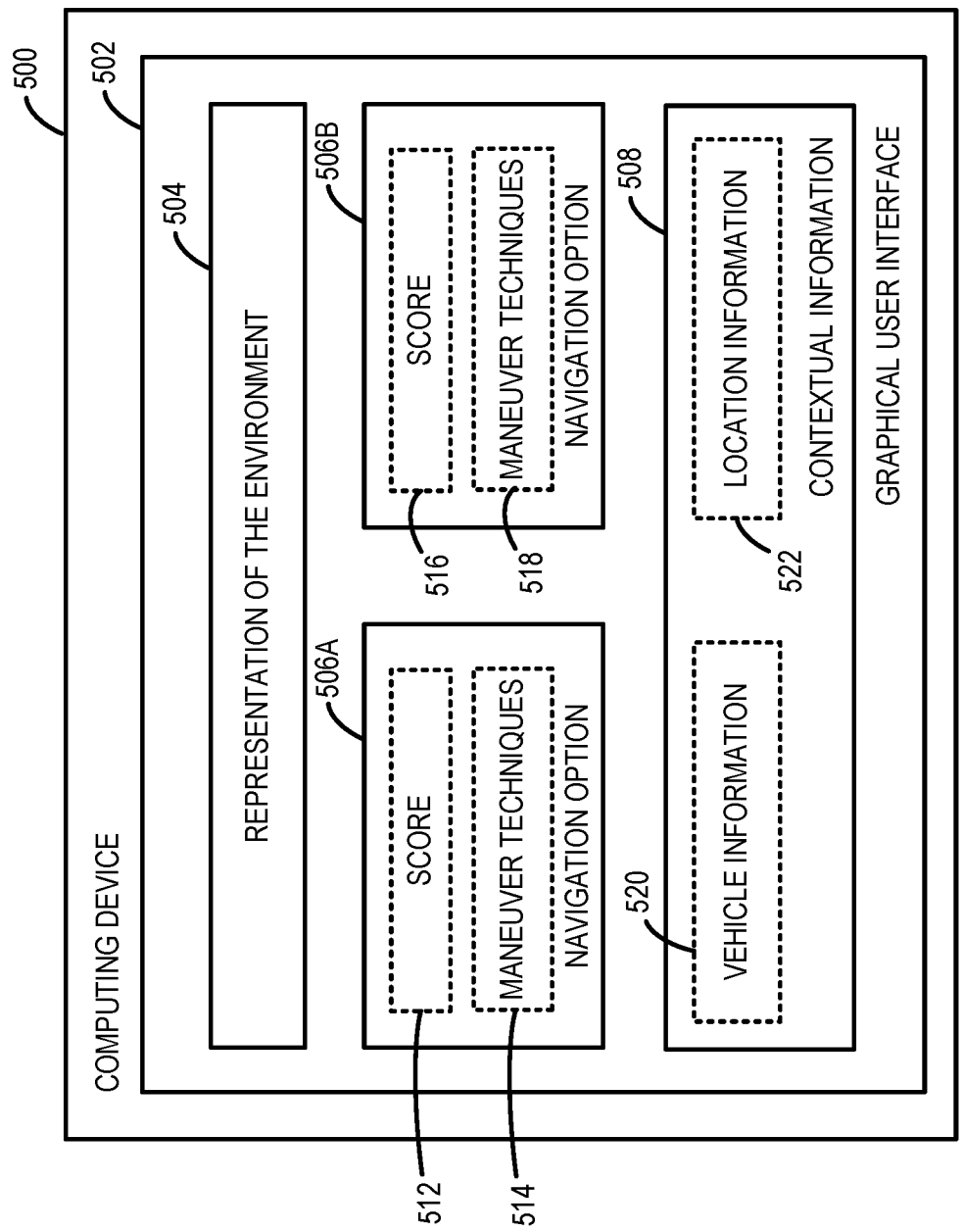
FIG. 5 illustrates a computing device displaying a graphical user interface for enabling remote assistance, according to one or more example embodiments.

FIG. 5 illustrates a computing device displaying a GUI for enabling delivery of remote assistance to a vehicle, according to one or more example embodiments. In the example embodiment, computing device 500 is displaying GUI 502, which includes representation of the environment 504, navigation option 506A, navigation option 506B, and contextual information 508. In other embodiments, GUI 502 may include more or less elements in other potential arrangements.

GUI 502 represents a system of interactive visual components for computer software. As such, GUI 502 can be used to display objects that convey information to a remote operator and also represent actions that can be taken by the remote operator. Computing device 500 may generate GUI 502 based on templates enabling an available remote operator to quickly review and provide assistance to a vehicle. In addition, computing device 500 may display GUI 502 on a display interface, such as a touch screen or external monitor. In other examples, computing device may display GUI 502 or elements from GUI 502 via a display interface associated with a head-mounted wearable computing device (e.g., augmented reality).

Computing device 500 may use GUI 502 to enable interaction between a human operator and vehicles that request assistance. The human operator may provide inputs to computing device 500 via touch inputs, buttons or hardware inputs, motion and vocal inputs. For example, computing device 500 may include a microphone to receive vocal inputs and use speech recognition software to derive operations based on the vocal inputs from the operator. In some examples, computing device 500 may resemble a vehicle emulator that enables a human operator to experience a simulation that mimics the vehicle's perspective.

Representation of the environment 504 is an object displayable via GUI 502 that can represent the current environment (or recent environment) from the perspective of the vehicle. By displaying representation of the environment 504, a remote operator may review a sensor perspective of the environment as captured by vehicle sensors. For instance, representation of the environment 504 may display images and/or video of the environment as captured by vehicle cameras. In other instances, sensor data from different types of sensors can be used to generate and provide representation of the environment 504 via GUI 502. For instance, representation of the environment 504 may include a point cloud developed using radar and/or LIDAR. As such, representation of the environment 504 may show the positions of obstacles or other environment elements that may have disrupted the path of travel of the vehicle that is requesting assistance. For example, representation of the environment 504 may depict the road, other vehicles, pedestrians, bicycles, traffic signals and signs, road elements, and other features within the vehicle's environment.

In some examples, representation of the environment 504 may depict the vehicle's environment in real-time. For example, vehicle sensors (e.g., cameras) may capture and provide sensor data (e.g., images) of the environment in near real-time to computing device 500 enabling a human operator to observe the current state of the vehicle's environment.

Computing device 500 may use visual indicators, such as arrows, boxes, or a combination to highlight aspects of the environment, such as the obstacles blocking the path of travel of the vehicle. For example, computing device 500 may use computer vision to detect elements within images and identify elements using different colors, such as red boxes to identify pedestrians, blue boxes for other vehicles, and green boxes for stationary objects.

Computing device 500 may further obtain map data based on a location of the vehicle. For instance, the vehicle may provide GPS measurements or another indication of the vehicle's location within the request for assistance or during subsequent communication between the vehicle and computing device 500. By using the vehicle's location, computing device 500 can acquire map data and further enhance the information included within representation of the environment 504 and/or other objects displayed via GUI 502. For example, computing device 500 can determine and display representation of environment 504 as an elevated view of the vehicle and nearby surroundings estimated based on the map data and the sensor data from the vehicle. In some examples, GUI 502 may include both a sensor perspective of the vehicle's environment and the elevated view estimated based on one or both of the sensor data and map data.

Navigation options 506A, 506B represent different strategies that may be displayed by GUI 502. A human operator may review and select navigation option 506A or navigation option 506B to cause computing device 500 to relay instructions to the vehicle to perform. In particular, the vehicle may receive the instructions from computing device 500 and perform the selected navigation option while monitoring for changes in the environment that may require modifying or stopping performance of the selected navigation option. For instance, while performing the selected remote assistance strategy (e.g., navigation option 506A), the vehicle may detect the presence of another vehicle or pedestrian that may alter the performance of the remote assistance strategy.

In the embodiment shown in FIG. 5, GUI 502 shows two navigation options (i.e., navigation options 506A, 506B). In some instances, GUI 502 may show only one navigation option or more than two navigation options. The number of navigation options may depend on the situation that the vehicle is involved in when requesting assistance. In some examples, the number of navigation options may also be limited to potentially decrease the amount of time that the human operator uses to provide options. For example, a high number of navigation options (e.g., 4 or more) may take too much time to review. In addition, the quality of the proposed navigation options may decrease as the quantity increases. In some examples, the autonomous vehicle may be configured to only transmit the best navigation options based on sensor data measuring the environment.

In some examples, computing device 500 may receive a request for assistance that does not include any proposed navigation options. Computing device 500 may display GUI 502 with an indication that the vehicle systems are requesting the human operator to develop and provide a navigation strategy to the vehicle to perform. The navigation strategy may specify a route that starts at the vehicle's current location and involves a target destination or target path to continue navigation from. GUI 502 may enable a human operator to adjust existing navigation options or provide a custom navigation strategy developed by the human operator.

In some examples, navigation options 506A, 506B may be displayed in a visual representation that enables quick review by a human operator. For instance, navigation options 506A, 506B may be depicted as virtual paths on representation of the environment 504. Displaying navigation option 506A, 506B as virtual paths on representation of the environment 504 may be beneficial for when a vehicle is attempting to circumvent or exit a situation quickly. For example, when the vehicle is trying to navigate a parking lot or around construction or an accident, GUI 502 may show one or more navigation options as virtual paths or using other symbols on images, video, or other sensor data representing the area surrounding the vehicle. This technique can enable a human operator to closely review the environment of the vehicle and to provide useful remote assistance based on a clear understanding of the environment.

In some examples, GUI 502 may display multiple navigation options (e.g., both navigation option 506A and navigation option 506B) together to enable a human operator to review and compare. For examples, GUI 502 may display a route for navigation option 506A as a blue-color virtual path and a route for navigation option 506B as a red-color virtual path on representation of the environment 504. In some instances, GUI 502 may be configured to display only a single navigation option at a time to avoid confusion. In addition, computing device 500 may obtain map data for the vehicle's current location and display the routes for each navigation option 506A, 506B using the map data. For instance, map data may be used to display navigation strategies that may involve a significant detour or substantial travel distance overall (e.g., more than half a mile or another threshold distance).

In some examples, a virtual path may be displayed in an augmented reality via images and/or video data received the vehicle by computing device 500 in near real-time. Particularly, the human operator may watch and monitor the vehicle's environment using video, images, or other sensor data from the vehicle as the vehicle awaits and receives remote assistance. For example, GUI 502 can display the images or video received from the vehicle in near real-time to enable the human operator to provide continuous assistance to the vehicle. The human operator can adjust the vehicle's route or maneuvers as the vehicle navigates.

In some examples, the virtual paths for navigation options 506A, 506B can be further divided and displayed as segments with checkpoints between consecutive segments. The vehicle may be configured to provide an update at each checkpoint to computing device 500. In some instances, the vehicle may be configured to temporarily stop at each checkpoint (or a subset of the checkpoints). Computing device 500 may be configured to provide a status update or other information to the human operator at each checkpoint. In addition, the human operator may provide updates to the navigation path at a checkpoint.

GUI 502 may also enable the remote operator to provide a custom navigation option (e.g., drawing a desired path on map data or representation of environment 504). GUI 502 may also display an option to modify one or more parameters for each navigation option 506A, 506B.

In the embodiment shown in FIG. 5, each navigation option 506A, 506B may be displayed with additional information developed to assist the human operator review, such as score 512 and score 516, respectively. Scores 512, 516 may be determined by vehicle based on parameters associated with performing each navigation option 506A, 506B. For example, when a navigation option requires performance of one or more complex maneuvers (e.g., reversing, U-turn), disfavored maneuvers, and/or reducing the vehicle's safety buffer maintained around the vehicle, the corresponding score may be lower relative to a navigation option that does not include the complex maneuvers. Scores 512, 516 can also depend on the time to complete each navigation option 506A, 506B, respectively.

As shown in FIG. 5, each navigation option 506A, 506B may also indicate maneuver techniques 514, 518, respectively. Maneuver techniques 514, 518 may convey one or more maneuvers that the vehicle will perform should a particular navigation option be selected. For example, navigation option 506A may include a U-turn, which is represented by maneuver technique 514 as a description (e.g. "U-turn here") or a visual representation. In some examples, only maneuver techniques that require human operator approval prior to performance may be represented via maneuver techniques 514, 518.

GUI 502 also includes contextual information 508, which may convey additional information to supplement a remote operator's understanding of the vehicle's situation. As shown in FIG. 5, contextual information 508 includes vehicle information 510 and location information 522. Vehicle information 510 may indicate a variety of information about the vehicle, such as the type of vehicle, the vehicle sensors on the vehicle, the quantity of the passengers, and target destination, etc. Location information 522 may represent information based on the current location of the vehicle, such as map data depicting the environment. Contextual information 508 may also specify information related to the situation, such as how long has the vehicle been stranded and a reason proposed by the vehicle for the stranding.

Figure 6A:
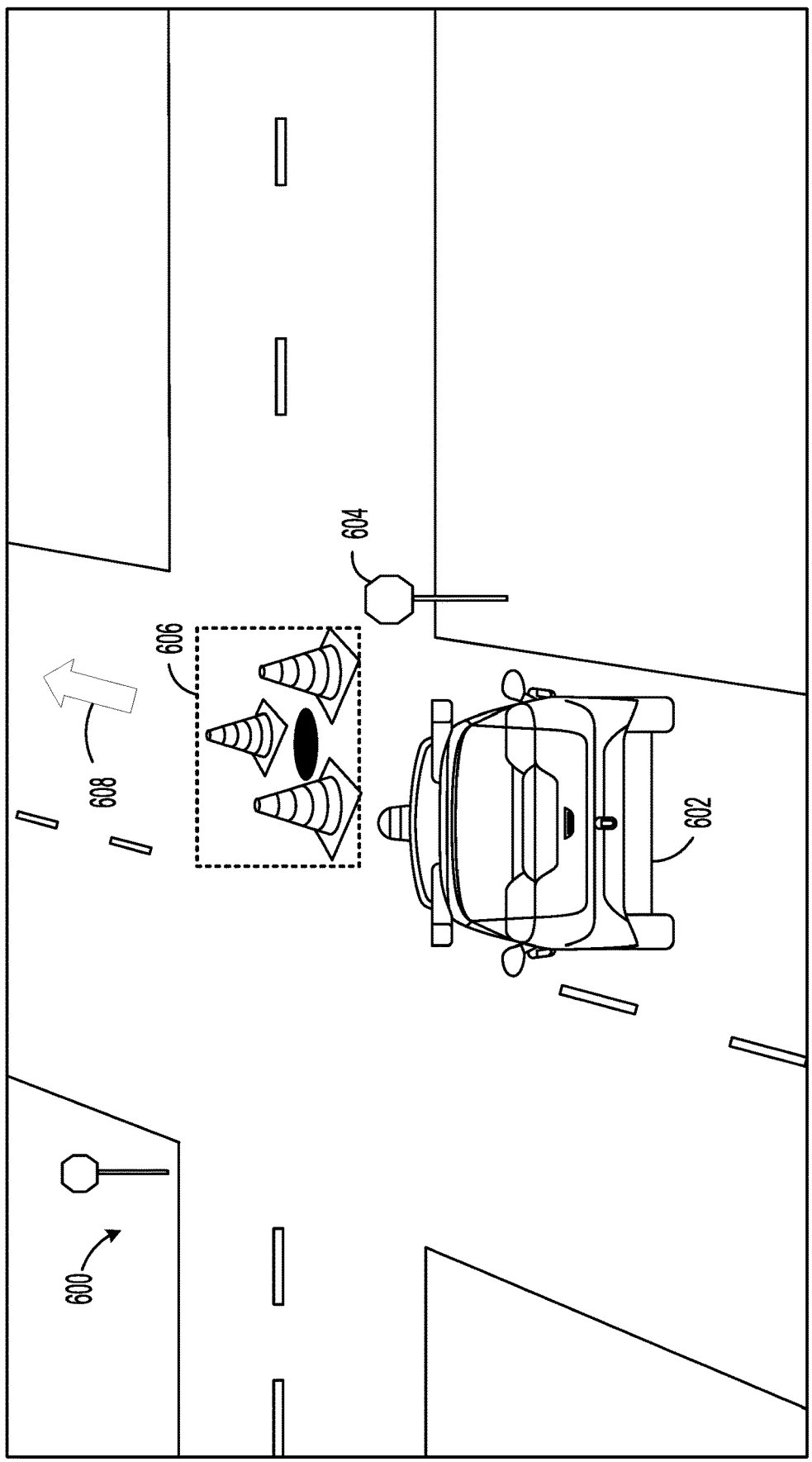
FIG. 6A illustrates a scenario involving a vehicle encountering an obstacle during navigation, according to one or more example embodiments.
Figure 6B:
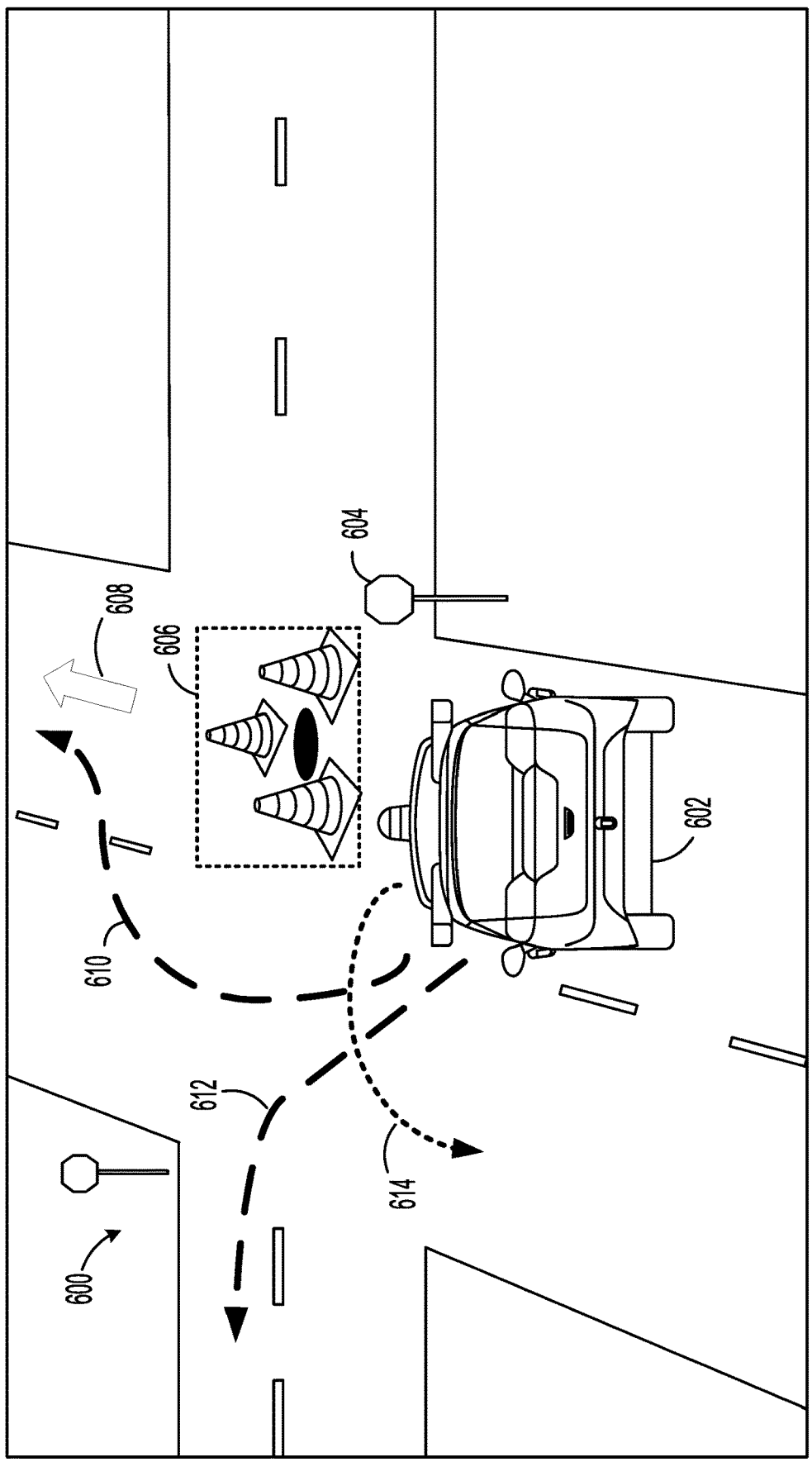
FIG. 6B further illustrates the vehicle determining navigation options in response to encountering the obstacle in the scenario shown in FIG. 6A, according to one or more example embodiments.
Figure 6C:
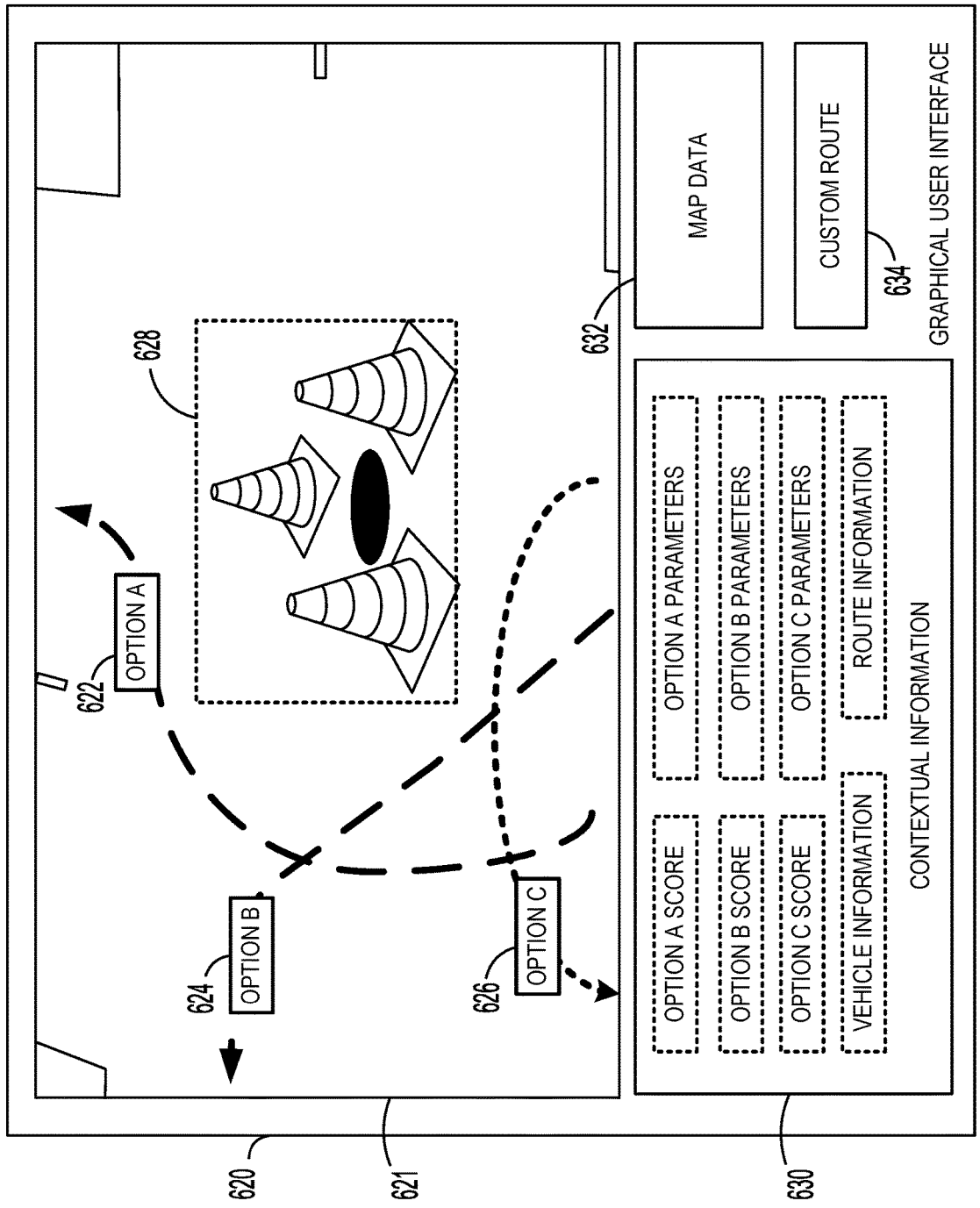
FIG. 6C illustrates a graphical user interface for enabling remote assistance to be provided to the vehicle shown in FIGS. 6A and 6B, according to one or more example embodiments.

FIGS. 6A, 6B, 6C illustrate a scenario involving a vehicle using remote assistance to maneuver to a location, according to one or more example embodiments. In FIG. 6A, scenario 600 is shown with an environment perspective from the view point from behind vehicle 602. As shown in scenario 600, vehicle 602 is shown stopped at a four way intersection based on detecting stop sign 604. Due to the presence of obstacle 606 blocking navigation path 608, vehicle 602 may request remote assistance. In particular, obstacle 606 is shown as traffic cones and an open manhole in the intersection that prevents vehicle 602 from navigating straight through the intersection to continue along navigation path 608. Other example scenarios can involve other types of obstacles that vehicle 602 may encounter during navigation in various environments.

In the embodiment shown in FIG. 6A, the presence of obstacle 606 interferes with navigation path 608 of vehicle 602. In other words, vehicle 602 is not able to continue navigating through the intersection according to navigation path 608 without deviating from conventional navigation rules since obstacle 606 is in the way. For example, vehicle 602 could navigate on the opposite side of the road (a disfavored maneuver) to circumvent obstacle 606. As a result, vehicle 602 may be configured to request for remote assistance since subsequent navigation likely involves vehicle 602 navigating in a way to avoid obstacle 606 that deviates from navigation path 608.

As shown, to circumvent obstacle 606, vehicle 602 might need to execute one or more maneuver techniques that are not included within the maneuver techniques typically executed by vehicle 602 during navigation. In some embodiments, vehicle 602 may not be able to perform one or more maneuver techniques needed to avoid obstacle 606 without prior approval from a remote operator. As such, a vehicle system (e.g., the navigation system) from vehicle 602 may transmit the request to a remote assistance network, which may subsequently connect the vehicle system with the computing device of a remote operator that can promptly provide assistance to help vehicle systems overcome the issue.

In some embodiments, vehicle systems may be configured to request for remote assistance after being stranded in the same location for a threshold duration of time (e.g., 60 seconds). The threshold duration of time can vary within examples and may depend on external factors, such as the presence of vehicles behind (or nearby) vehicle 602. For example, when a vehicle is detected behind vehicle 602, the threshold duration for requesting remote assistance may be shorter to avoid delaying the vehicle or vehicles waiting for vehicle 602 to move.

The request may include information that depicts the situation encountered by vehicle 602. For example, the request may include an indication that vehicle 602 is stopped at a particular location and a sensor perspective of the environment as measured from the current location of vehicle 602. The sensor perspective can include a different amount of information and measurements from one or more types of sensors. In some examples, the sensor perspective can be conveyed as a 3D map of the environment generated by the sensor processing system of the vehicle using one or more types of sensors. The sensor perspective can include images or video from cameras, LIDAR measurements, radar measurements, GPS measurements, and motion measurements from inertial measurement unit (IMU), among other options. As such, the computing device receiving the request for assistance may responsively generate a GUI that can allow for a remote operator to review the situation and provide assistance. For example, the computing device may generate a GUI similar to GUI 502 shown in FIG. 5. The GUI can convey sensor data in different arrangements and other information related to the situation (e.g., map data).

FIG. 6B further illustrates vehicle 602 determining a set of navigation options in response to encountering obstacle 606 as depicted in scenario 600 illustrated in FIG. 6A, according to one or more example embodiments. Vehicle 602 may determine navigation option 610, navigation option 612, and navigation option 614 in response to detecting the presence of obstacle 606 partially blocking navigation path 608. As such, one or more systems of vehicle 602 may communicate a request for remote assistance and navigation options 610-614 to one or more computing devices in order to obtain remote assistance from a remote operator. For instance, vehicle 602 may transmit the request for assistance to a network configured to receive and subsequently connect vehicle 602 to the computing device of a remote operator available to provide remote assistance. Vehicle 602 may include navigation options 610-614 in the initial request for assistance or may subsequently communicate navigation options 610-614 after establishing a secure wireless connection with the computing device used by a remote operator.

Vehicle 602 may utilize sensor data from one or more types of vehicle sensors to determine each navigation option 610-614. The number of navigation options 610-614 can vary within embodiments and may depend on aspects of the particular scenario. In particular, scenario 600 shown in FIGS. 6A and 6B involves an intersection that may offer alternative routes that vehicle 602 can use to determine navigation options 610-614 as shown. In other scenarios, vehicle 602 may be able to determine more or fewer navigation options depending on the environment. For example, a scenario involving a vehicle navigating within a parking lot may have limited navigation options if there are numerous vehicles parked in the parking lot limiting available navigation routes.

In some embodiments, vehicle 602 may estimate and associate a score with each navigation option 610-614, which can be subsequently used by the remote operator providing remote assistance. Each score can depend on various parameters with each navigation option 610-614 and may be used to provide the remote operator with a reference system for comparing navigation options 610-614. In some instances, the score for a given navigation option depends on the maneuver techniques used to complete the navigation option. For example, navigation option 614 may have a lower score than navigation options 610, 612 because navigation option 614 requires vehicle 602 to execute a U-turn. The U-turn may be considered a difficult maneuver technique that requires remote approval prior to execution.

In addition, the score can also depend on the amount a navigation option deviates from the original path (i.e., navigation path 608) of vehicle 602. For example, navigation option 610 may have a higher score than navigation options 612, 614 because navigation option 610 helps vehicle 602 resume navigation path 608 quickly while the other navigation options 612, 614 may result in vehicle 602 taking a longer detour to reach the desired destination. Thus, in some examples, map data can be used to determine scores for each navigation option 610-614. The map data can be used to determine route times and other potential factors that are weighed when determining scores for each navigation option.

The score can also depend on other factors. For instance, each score may depend on whether or not vehicle 602 would need to temporarily reduce the safety buffer maintained around vehicle 602 while navigating to complete a particular navigation option. The longer duration (i.e., period of time) that vehicle 602 might need to reduce its safety buffer to execute a navigation option may reduce that option's score. In addition, when the performance of a navigation option requires vehicle 602 to temporarily break one or more rules of the road, the score associated with that option might be decreased relative to other navigation options that do not require breaking any rules of the road. In some embodiments, the score for each navigation option can be determined based on weighted analysis of multiple factors, such as the maneuver techniques used for each navigation option. For example, vehicle 402 may factor and weigh various parameters to develop a score for each navigation option.

When transmitting options to a computing device for remote assistance, vehicle 602 may provide navigation options 610-614 in various formats. In some examples, vehicle 602 may provide navigation options 610-614 in a visual format, such as virtual representations layered on sensor data as further shown in FIG. 6C.

In some embodiments, vehicle 602 may only convey a top navigation option (e.g., navigation option 610) to the human operator to receive confirmation before proceeding. Limiting the options can accelerate the overall remote assistance process since the human operator has less to review and can approve or modify the proposed option (e.g., navigation option 610). In some instances, vehicle 602 may only convey sensor information (e.g., images or video) of the environment including obstacle 606 and request for assistance with developing a strategy or identifying obstacle 606. Other variations are possible within examples.

FIG. 6C depicts a GUI for enabling remote assistance for scenario 600 illustrated in FIGS. 6A and 6B. Particularly, a computing device may cause GUI 620 to display on a display interface, such as a touchscreen or a high definition (HD) display similar to computing device 500 displaying GUI 502 as illustrated in FIG. 5. As shown, GUI 620 includes environment representation 621, contextual information 630, map data 632, and custom route 634. In further examples, GUI 620 may further include other options. For instance, GUI 620 may include a request more information option, which the remote operator can use to obtain additional sensor data or communicate with a passenger.

Environment representation 621 may convey a perspective of the environment based on sensor data obtained from vehicle sensors, such as cameras. In other embodiments, environment representation 621 may display a larger portion of vehicle's 602 environment to provide additional information for the human operator to use to make a decision. For instance, environment representation 621 may utilize a combination of sensor measures from areas around the vehicle to portray vehicle 602 within the environment for the human operator to use when providing remote assistance.

In the embodiment shown in FIG. 6C, GUI 620 shows virtual representation of navigation options as option A 622, option B 624, and option C 626. Particularly, option A 622 is a virtual representation of navigation option 610 determined by vehicle 602, option B 624 is a virtual representation of navigation option 612 determined by vehicle 602, and option C 626 is a virtual representation of navigation option 614 determined by vehicle 602. Each option 622-626 is shown as an overlay on environment representation 621 to show how vehicle 602 can navigate and avoid virtual obstacle 628 representing obstacle 606 detected in by vehicle sensors as shown in FIG. 6A and FIG. 6B. In some examples, options can be shown in different colors and further segmented to include checkpoints that can enable easier monitoring and modification.

In some examples, GUI 620 may only show one option at a given time. Alternatively, a human operator can customize which options are shown. In addition, GUI 620 may enable an operator to adjust one or more aspects of the options as well as provide custom route 634 for vehicle 602 to perform. Custom route 634 may represent a navigation strategy provided by the human operator tasked with providing remote assistance. For example, a human operator may draw custom route 634 on environment representation 621 or map data 632 to customize the route utilized by vehicle 602. As such, GUI 620 may also include map data 632, which may correspond to one or more maps that represent the current location of vehicle 602. A human operator may use map data 632 to help route plan for a vehicle requesting remote assistance.

In addition, GUI 620 may also include contextual information 630, which can include additional information or data that can help a human operator (or the computing device) provide remote assistance to vehicle 602. In the embodiment shown in FIG. 6C, contextual information 630 includes scores and parameters for each option respectively (i.e., option A 622, option B 624, and option C 626). As discussed above, the parameters associated with performance of an option may influence the score for the option. Particularly, deviation from the desired path (e.g., navigation path 608 shown in FIG. 6A), the difficulty of maneuvers associated with a given option, the time required to complete an option, the quantity and complexity of disfavored maneuvers, and other factors (e.g., how long and the extent of which the vehicle might need to reduce the safety buffer maintained around the vehicle) can impact the score for an option. Contextual information 630 also includes vehicle information and route information. Route information may indicate a current location of vehicle 602 and a target destination (e.g., a location where vehicle 602 is dropping off passengers or objects).

Figure 7:
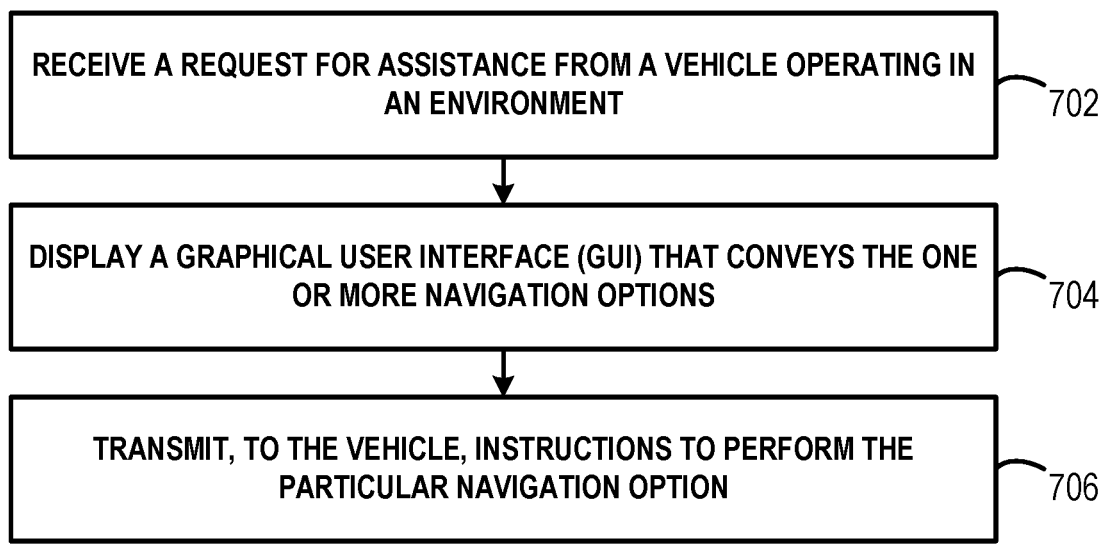
FIG. 7 is a flow chart of a method for using remote assistance to maneuver an autonomous vehicle to a location, according to one or more example embodiments.

FIG. 7 is a flow chart of a method for vehicle occupancy confirmation, according to example implementations. Method 700 represents an example method that may include one or more operations, functions, or actions, as depicted by one or more of blocks 702, 704, and 706, each of which may be carried out by any of the systems, devices, and/or vehicles shown in FIGS. 1-6C, among other possible systems. For instance, system 400 depicted in FIG. 4 may enable execution of method 700.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 702, method 700 involves receiving a request for assistance from a vehicle operating in an environment. The request may indicate the vehicle is stopped at a first location and specify one or more navigation options for enabling the vehicle to navigate from the first location to a second location. In some instances, at least one navigation option includes one or more maneuver techniques that requires operator approval prior to execution.

In some examples, the vehicle may transmit the request after a threshold duration of time has passed since the vehicle initially became stranded. For example, the vehicle may request for assistance after 60 seconds has passed because the environment might change during the 60 seconds that enables the vehicle to safely proceed with navigation without remote assistance.

At block 704, method 700 involves displaying a graphical user interface (GUI) that conveys the one or more navigation options. The computing device may display the navigation options responsive to receiving the request for assistance.

In some embodiments, the computing device may also receive an indication of the first location and the second location and subsequently obtain map data representative of the first location and the second location. This way, the computing device may display, using map data, a virtual path for each navigation option that enables the vehicle to navigate between the first location and the second location. The computing device may also display the virtual path using sensor data (e.g., images) obtained from the vehicle. Displaying the virtual path for each navigation option can further involve dividing each virtual path into a set of segments. Each pair of consecutive segments may be separated via a checkpoint. The computing device may receive a progress update at each checkpoint as the vehicle navigates from the first location to the second location while performing a given navigation option.

The computing device may also display each navigation option with an option to modify one or more parameters of the navigation option. The option to modify can enable a human operator to adjust the path to be traveled, the maneuvers that the vehicle will perform, the speed at which the vehicle will travel during performance of the navigation option, or other parameters.

In addition, the computing device may also display each navigation option with a corresponding score that represents a difficulty associated with the vehicle performing one or more maneuvers to complete the navigation option. The computing device may further display each navigation option with one or more maneuver techniques that require operator approval prior to performance with an indication representing each maneuver technique from the one or more maneuver techniques that require operator approval prior to performance. The computing device can also determine one or more navigation options that involve temporarily reducing a buffer around the vehicle during performance and displaying, for the one or more determined navigation options, an indication that the buffer around the vehicle is temporarily reduced during performance.

At block 706, method 700 involves transmitting, to the vehicle, instructions to perform the particular navigation option based on detecting a selection of a particular navigation option from the one or more navigation options.

After receiving the instructions, the vehicle may be configured to navigate from the first location to the second location by performing the particular navigation option while monitoring for one or more changes in the environment. Particularly, monitoring the environment using one or more vehicle sensors can enable vehicle systems to stop moving forward (or in another direction) when needed to maintain safety.

In some embodiments, the computing device may receive a new navigation option that enables the vehicle to navigate from the first location to the second location. For example, the computing device may display map data representative of the first location and the second location with an option to draw one or more additional navigation options between the first location and the second location. Responsive to receiving the new navigation option, the computing device may transmit instructions to the vehicle to perform the new navigation option. The vehicle may be configured to navigate from the first location to the second location by performing the new navigation option while monitoring for one or more changes in the environment.

Figure 8:
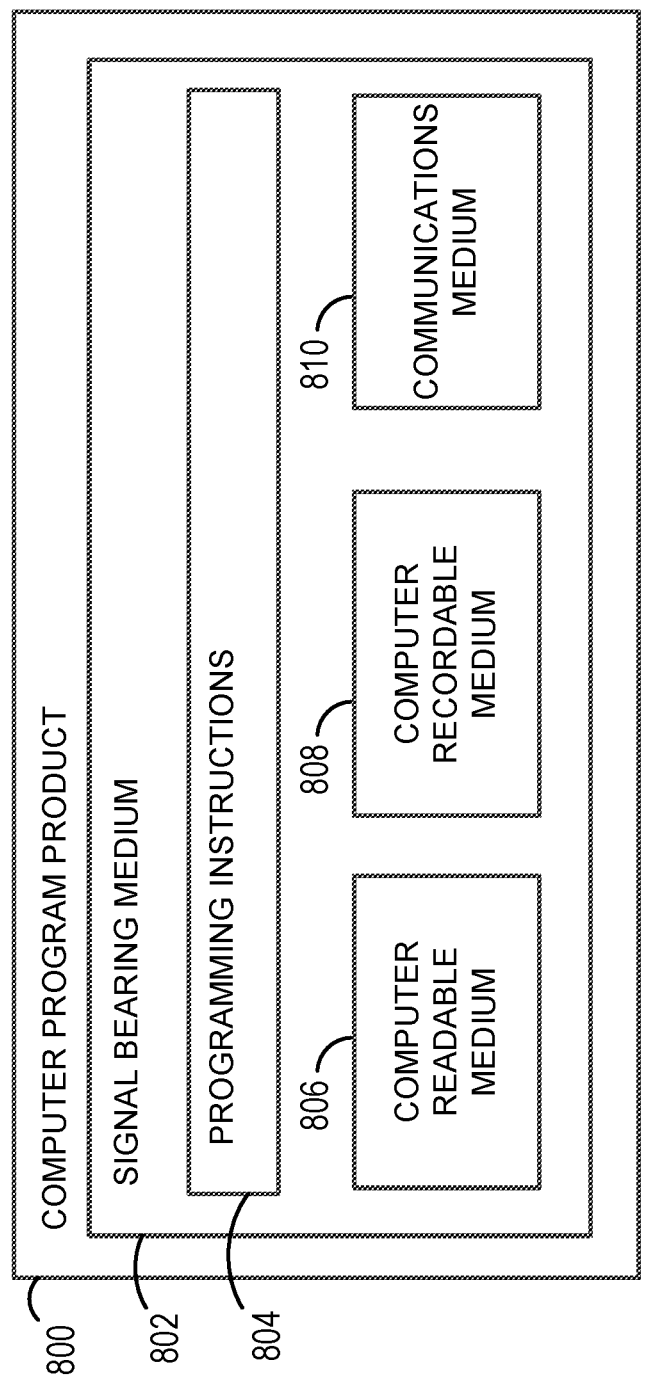
FIG. 8 is a schematic diagram of a computer program, according to one or more example embodiments.

FIG. 8 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In the embodiment shown in FIG. 8, computer program product 800 is provided using signal bearing medium 802, which may include one or more programming instructions 804 that, when executed by one or more processors may provide functionality or portions of the functionality described above with respect to FIGS. 1-7.

Signal bearing medium 802 may encompass a non-transitory computer-readable medium 806, such as, but not limited to, a hard disk drive, a Compact Disc (CD), a Digital Video Disk (DVD), a digital tape, memory, components to store remotely (e.g., on the cloud) etc. In some implementations, signal bearing medium 802 may encompass computer recordable medium 808, such as, but not limited to, memory, read/write (R/W) CDs, R/W DVDs, etc.

In some implementations, signal bearing medium 802 may encompass communications medium 810, such as, but not limited to, a digital and/or an analog communication medium (e.g., a fiber optic cable, a waveguide, a wired communications link, a wireless communication link, etc.). Similarly, signal bearing medium 802 may correspond to a remote storage (e.g., a cloud). A computing system may share information with the cloud, including sending or receiving information. For example, the computing system may receive additional information from the cloud to augment information obtained from sensors or another entity. Thus, for example, signal bearing medium 802 may be conveyed by a wireless form of communications medium 810.

One or more programming instructions 804 may be, for example, computer executable and/or logic implemented instructions. In some examples, a computing device such as computer system 112 shown in FIG. 1 or computing device 300 shown in FIG. 3 may be configured to provide various operations, functions, or actions in response to programming instructions 804 conveyed to the computer system by one or more of computer readable medium 806, computer recordable medium 808, and/or communications medium 810. The non-transitory computer readable medium could also be distributed among multiple data storage elements and/or cloud (e.g., remotely), which could be remotely located from each other. Computing device that executes some or all of the stored instructions could be a vehicle. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving, by a first computing system coupled to an autonomous vehicle, sensor data representing an environment of the autonomous vehicle;
determining, based on the sensor data, an obstacle is impeding a current path of the autonomous vehicle;
transmitting, by the first computing system, a request to perform a U-turn maneuver to a second computing system based on determining the obstacle is impeding the current path of the autonomous vehicle, wherein the autonomous vehicle requires operator approval provided by the second computing system prior to performing the U-turn maneuver; and
based on receiving the operator approval from the second computing system, causing, by the first computing system, the autonomous vehicle to perform the U-turn maneuver.

2. The method of claim 1, wherein transmitting the request to perform the U-turn maneuver to the second computing system comprises:
transmitting the request with sensor data representing the environment of the autonomous vehicle, wherein the second computing system is configured to display the sensor data representing the environment.

3. The method of claim 2, further comprising:
transmitting data representing a new path that includes the U-turn maneuver with the request to perform the U-turn maneuver, wherein the second computing system is configured to display a virtual path based on the new path.

4. The method of claim 1, further comprising:
based on receiving a new path from the second computing system, causing the autonomous vehicle to navigate according to the new path.

5. The method of claim 1, further comprising:
transmitting a plurality of navigation options to the second computing system, wherein the plurality of navigation options comprises a given navigation option that involves the autonomous vehicle performing the U-turn maneuver.

6. The method of claim 5, further comprising:
determining a score for each navigation option of the plurality of navigation options, wherein the score represents a difficulty associated with the autonomous vehicle performing a given navigation option; and
transmitting respective scores with the plurality of navigation options to the second computing system.

7. The method of claim 6, wherein determining the score for each navigation option comprises:
determining the score further based on a time to complete the given navigation option.

8. The method of claim 1, further comprising:
transmitting a request to perform a navigation option that includes crossing over a medium based on determining the obstacle is impeding the current path of the autonomous vehicle.

9. The method of claim 1, wherein determining the obstacle is impeding the current path of the autonomous vehicle comprises:
determining that an accident involving at least one other vehicle is impeding the current path of the autonomous vehicle.

10. The method of claim 1, wherein determining the obstacle is impeding the current path of the autonomous vehicle comprises:
determining that road construction is impeding the current path of the autonomous vehicle.

11. The method of claim 1, further comprising:
based on determining the obstacle is impeding the current path of the autonomous vehicle, causing the autonomous vehicle to remain stopped while transmitting the request to perform the U-turn maneuver to the second computing system.

12. A system comprising:
an autonomous vehicle comprising one or more sensors;
a first computing system coupled to the autonomous vehicle, wherein the first computing system is configured to:
receive sensor data representing an environment of the autonomous vehicle;
determine, based on the sensor data, an obstacle is impeding a current path of the autonomous vehicle;
transmit a request to perform a U-turn maneuver to a second computing system based on determining the obstacle is impeding the current path of the autonomous vehicle, wherein the autonomous vehicle requires operator approval provided by the second computing system prior to performing the U-turn maneuver; and
based on receiving the operator approval from the second computing system, cause the autonomous vehicle to perform the U-turn maneuver.

13. The system of claim 12, wherein the first computing system is further configured to:
transmit the request with sensor data representing the environment of the autonomous vehicle, wherein the second computing system is configured to display the sensor data representing the environment.

14. The system of claim 13, wherein the first computing system is further configured to:
transmit data representing a new path that includes the U-turn maneuver with the request to perform the U-turn maneuver, wherein the second computing system is configured to display a virtual path based on the new path.

15. The system of claim 12, wherein the first computing system is further configured to:
based on receiving a new path from the second computing system, cause the autonomous vehicle to navigate according to the new path.

16. The system of claim 12, wherein the first computing system is further configured to:
transmit a plurality of navigation options to the second computing system, wherein the plurality of navigation options includes a given navigation option that involves the autonomous vehicle performing the U-turn maneuver.

17. The system of claim 16, wherein the first computing system is further configured to:
determine a score for each navigation option of the plurality of navigation options, wherein the score represents a difficulty associated with the autonomous vehicle performing a given navigation option; and
transmit respective scores with the plurality of navigation options to the second computing system.

18. The system of claim 12, wherein the first computing system is further configured to:
transmit a request to perform a navigation option that includes crossing over a medium based on determining the obstacle is impeding the current path of the autonomous vehicle.

19. The system of claim 12, wherein the first computing system is further configured to:
determine that an accident involving at least one other vehicle or road construction is impeding the current path of the autonomous vehicle.

20. A non-transitory computer readable medium configured to store instructions, that when executed by a first computing device, causes the first computing device to perform operations comprising:
receiving sensor data representing an environment of an autonomous vehicle;
determining, based on the sensor data, an obstacle is impeding a current path of the autonomous vehicle;
transmitting a request to perform a U-turn maneuver to a second computing device based on determining the obstacle is impeding the current path of the autonomous vehicle, wherein the autonomous vehicle requires operator approval provided by the second computing device prior to performing the U-turn maneuver; and
based on receiving the operator approval from the second computing device, causing the autonomous vehicle to perform the U-turn maneuver.

* * * * *